May 9, 1939. F. F. KISHLINE 2,157,761
SUPERCHARGER FOR INTERNAL COMBUSTION MOTORS
Filed Aug. 7, 1935 2 Sheets-Sheet 2
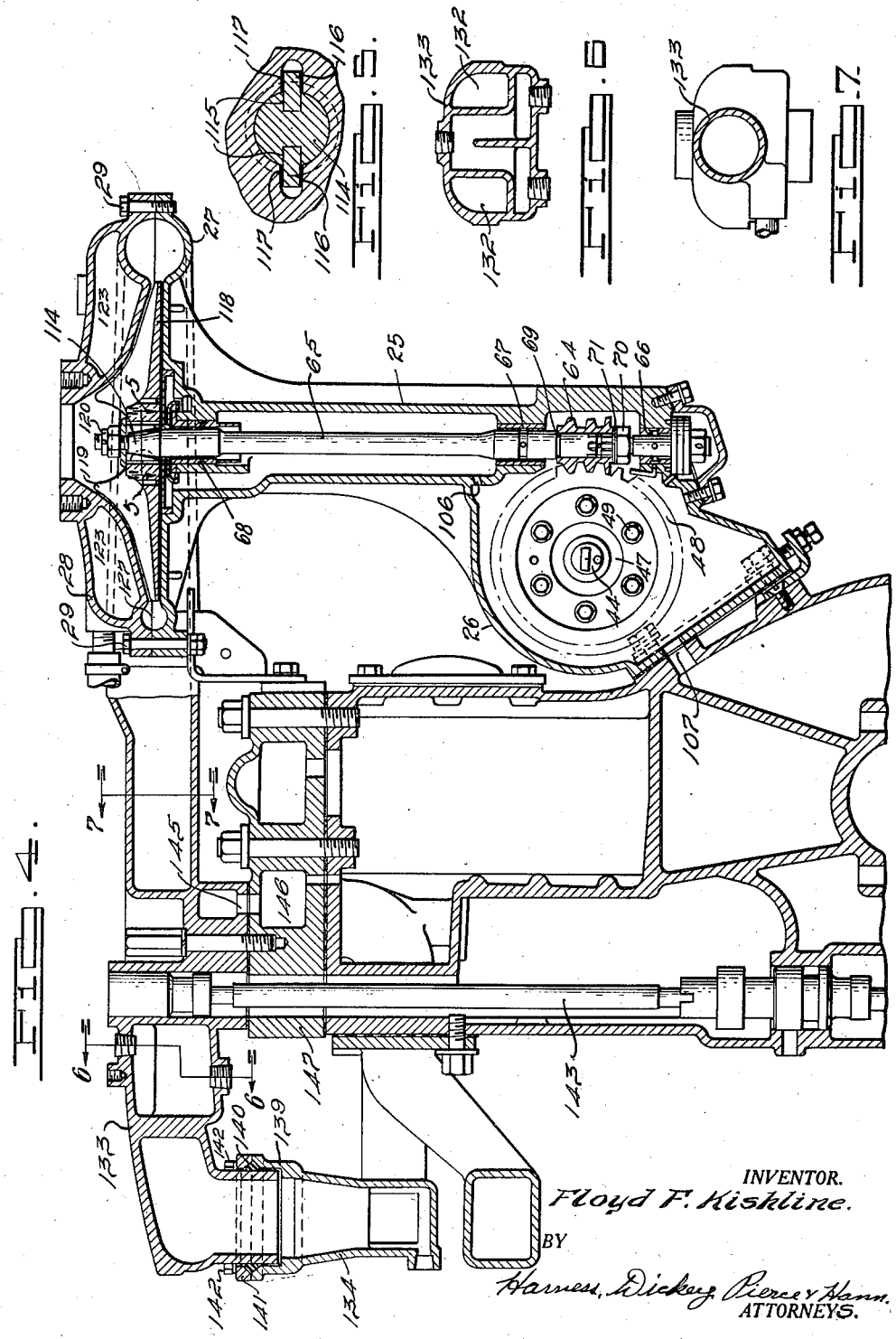
INVENTOR.
Floyd F. Kishline.
BY
Harness, Dickey, Pierce & Hann.
ATTORNEYS.

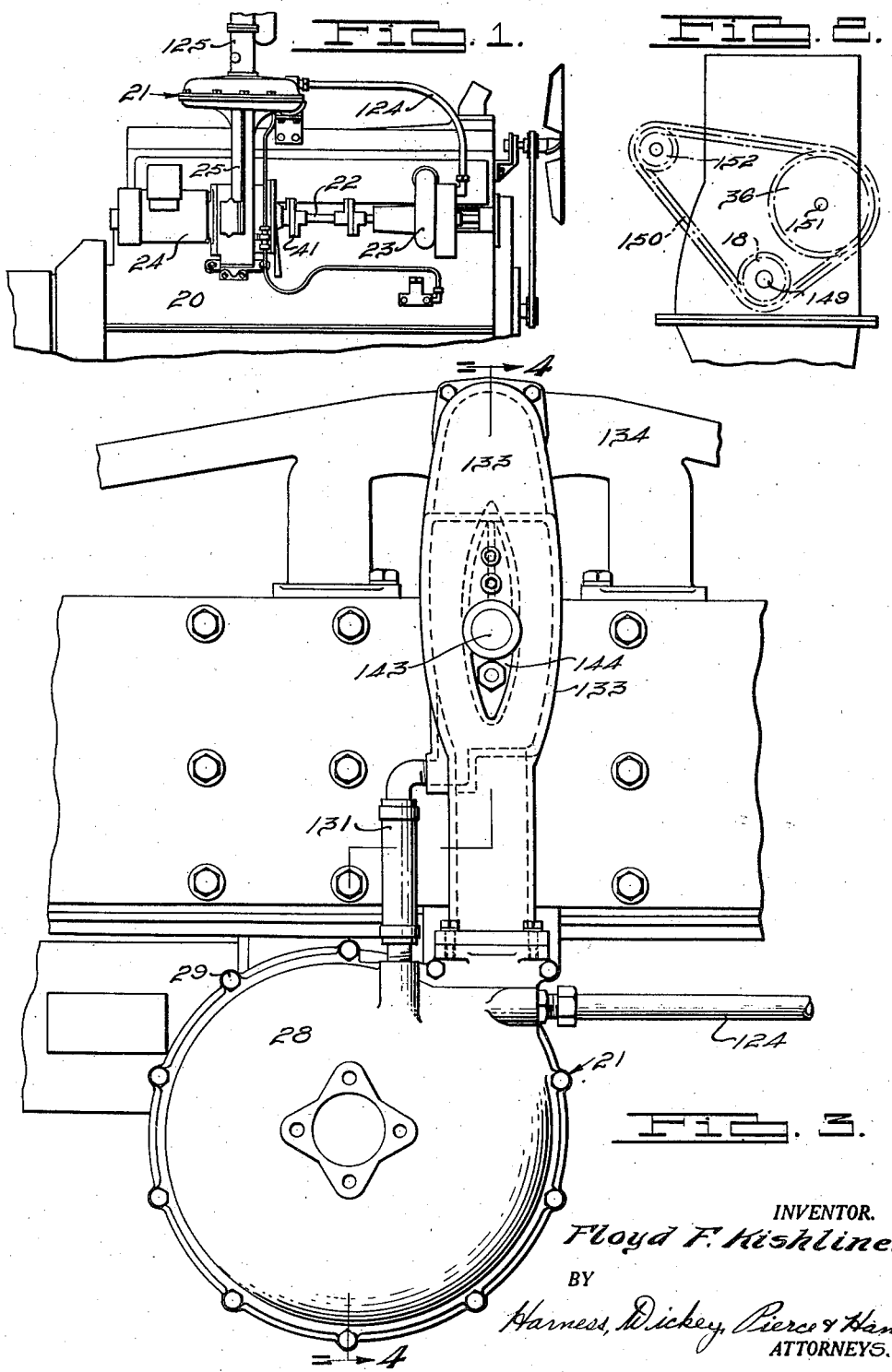

Patented May 9, 1939

2,157,761

UNITED STATES PATENT OFFICE 2,157,761

SUPERCHARGER FOR INTERNAL COMBUSTION MOTOR

Floyd F. Kishline, Detroit, Mich., assignor to Graham-Paige Motors Corporation, a corporation of Michigan Application August 7, 1935, Serial No. 35,022

2 Claims. (Cl. 123—119)

This invention relates to internal combustion motors and particularly to the fuel induction systems thereof and has particular relation to a supercharger construction employed in connection with such induction systems, the principal object being the provision of a new and novel construction which particularly lends itself to quantity production and continued and efficient service without requiring especial attention; which has no parts that are subject to unusual wear so as to require frequent replacement to maintain its efficiency, and which is of such simple and rugged character as to permit its assembly and/or disassembly by the usual types of garage mechanics with but little possibility of interfering with its proper operation.

Objects of the invention include the provision of a supercharger structure so constructed and arranged as to permit its accurate assembly to an internal combustion motor in a minimum of time and with a minimum amount of labor on the part of a single person; the provision of a supercharger construction for an internal combustion motor which is driven from the usual accessory drive shaft of the motor; the provision of a supercharger construction for an internal combustion motor so constructed and arranged as to permit major servicing operations on the motor to be performed without the necessity of dismantling or removing the supercharger structure; the provision of an internal combustion motor having an intake manifold located on one side thereof and a supercharger structure located on the other side thereof, the supercharger and the manifold being connected by a duct extending over the cylinder head of the motor; the provision of a structure as above described in which the connection between the duct extending across the cylinder head with the supercharger and with the intake manifold is such as to permit relatively wide ranges in manufacturing tolerances in the various connected parts and of such character as to substantially eliminate the transmission of vibratory forces through the connection; the provision of an internal combustion motor having a supercharger including an impeller rotatable about a substantially vertical axis and positioned above the cylinder head of the motor, the vertical driving shaft for the impeller extending downwardly therefrom and means operatively connected to suitable gear mechanism enclosed within the housing secured to the crank case of the motor; the provision of a supercharger construction for an internal combustion motor having an intake manifold in which the supercharger impeller housing is located above the manifold and provided with a downdraft carburetor above it to supply combustible mixture thereto; and the provision of a construction as above described in which the housing for the supercharger impeller is so constructed and arranged that liquid fuel particles coming in contact with the walls thereof will drain by gravity out of the housing and toward the intake manifold.

The above being among the objects of the present invention, the same consists in certain novel features of construction and combination of parts to be hereinafter described with reference to the accompanying drawings and then claimed, having the above and other objects in view.

An illustrative embodiment of this invention is shown in the accompanying drawings, in which:

Fig. 1 is a view in side elevation of a conventional in-line type of internal combustion motor equipped with my improved supercharger, the lower portion of the motor being broken away.

Fig. 2 is a diagrammatic view in front elevation of the same illustrating the manner in which the accessory shaft is driven in conjunction with the cam shaft from the crank shaft of the motor.

Fig. 3 is an enlarged fragmentary top plan view of the supercharger mounted on the motor but with the carburetor removed from the top of the supercharger.

Fig. 4 is a transverse vertical sectional view taken on the line 4—4 of Fig. 3, showing the motor, intake manifold and supercharger.

Fig. 5 is an enlarged gragmentary sectional view taken on the line 5—5 of Fig. 4 showing the manner in which the impeller is keyed to the top end of the impeller shaft.

Fig. 6 is an enlarged sectional view taken on the line 6—6 of Fig. 4, showing the duct which connects the supercharger with the intake manifold.

Fig. 7 is a sectional view taken on the line 7—7 of Fig. 4, showing the construction of the duct which provides communication between the supercharger and the intake manifold at a place closely adjacent the supercharger.

In the construction shown in the drawings, a conventional type of cylinder in-line internal combustion motor 20 is shown provided with the improved supercharger generally designated at 21 mounted on the crank case thereof and driven by an accessory shaft 22 which also drives water pump 23 and generator 24. The generator 24 is attached to that side of the supercharger driving gear housing opposite to the supercharger's attachment to the accessory shaft 22 so that the generator is in reality driven by the drive shaft of the supercharger which in turn is actuated by the accessory shaft.

The supercharger, per se, comprises a generally vertically disposed housing, the middle portion 25 of which will be hereafter designated as the impeller shaft housing; the lower portion 26, which will be hereafter referred to as the driving gear housing, and the upper part 27, which will be hereafter referred to as the lower half of the impeller housing. A complementary cover plate or housing 28 is secured to the housing 27 by bolts and cap screws 29 so as to form a suitable enclosure for the impeller of the supercharger.

Means are provided for driving the supercharger and comprise a flexible coupling 41, one end of which is attached to the accessory shaft 22, and the other end of which is provided with an interiorly splined hub which telescopes on the complementary splined end of a driving gear shaft 44. The driving gear shaft 44 is provided with an integrally formed radially extending hub 47 medially of its ends to which is secured a drive gear 48 of the cone type by means of a series of cap screws 49.

The end of the shaft 44 opposite to that connected to the accessory shaft is connected to the generator 24 in any suitable manner.

The worm 64 is splined on the lower end of a vertically disposed impeller shaft 65 which is journaled immediately above and below the worm in the bearings 66 and 67 respectively, and closely adjacent its upper end in a bearing 68. The lower end of the shaft 65 is provided with a shoulder 69 against which the worm 64 abuts and is held against said shoulder by a nut 70 threaded on the shaft 65 and secured in position by lock washers 71.

The upwardly extending end 114 of the impeller shaft is frusto-conical in shape and provided at diametrically opposite sides with key ways 115 for receiving keys 116, said keys extending into rather loosely fitting slots 117 formed in the hub of an impeller 118. The impeller 118 is in the form of a disc having a lower plane side, and an upper side provided with radially disposed, axially extending fins or blades 119 which are of decreasing height from the hub of the impeller outwardly.

The tapered end 114 of the shaft and the complementary hole formed in the impeller hub are disposed at a relatively steep angle so that tightening of the nut 120, by which the impeller is secured to the impeller shaft, will not exert an undue bursting strain on the impeller. However, the angle and fit of the impeller on the tapered shaft is such that when the nut 120 is securely tightened, the impeller is driven substantially entirely from its frictional fit on the shaft rather than through the keys 116, which keys are provided more as a safety precaution than as a regular driving means for the impeller.

The top or cover plate 28 of the impeller housing is provided with a water jacket opening 123 of varying cross sectional area and the point where the water jacket has the greatest cross sectional area is located adjacent to the place where the impeller suction pressure is the lowest. Water from the internal combustion motor cooling system pump 23 is supplied to the water jacket 123 by feed pipe 124.

A down draft carburetor 125, as shown in Fig. 1, is mounted on top of the impeller housing so as to discharge its fuel downwardly through the central opening 126 provided in the impeller housing cover 28 so that the fuel is drawn downwardly on to the top surface of the impeller 118 from which it is thrown outwardly by the impeller blades 119 into the collecting ring 127 which is formed beyond the outer peripheral edge of the impeller partly in the lower housing 27 and partly in the upper housing or cover plate 28.

Water passes out of the jacket 123 through a pipe and hose connection 131, as shown in Fig. 3, and into a water jacket 132 formed in the fuel duct 133 which carries the fuel from the supercharger to the motor intake manifold 134.

It has been found extremely difficult to secure a satisfactory connection between the supercharger and the intake manifold by means of rigid connections. For one thing the variations due to quantity production manufacturing methods makes it extremely difficult to have rigid connections in exact alignment and then due to vibration, such rigid connections failed after very short service, the ends of the duct embraced by the rigid connections becoming crystallized and cracked regardless of the metal from which they were formed.

This problem was solved by providing a flexible floating connection, as shown in Fig. 4.

The end of the duct 133 has a telescoping fit in spaced relation to a socket in an upstanding collar 139 formed on the manifold 134 and a rubber gasket ring 140 is compressed against the telescoped end of the duct by a clamping ring secured by cap screws 142.

In the particular internal combustion motor shown, the timing shaft 143 extends upwardly through the middle of the fuel duct 133, which duct is bifurcated to form equal passageways on each side of the streamlined island 144 formed in the middle thereof as shown clearly in Fig. 3. Water passing into the jacket 132 of the fuel duct 133 passes downwardly through an opening 145 into the cylinder head water jacket 146 from which it passes to the radiator in the usual manner.

In the operation of this device, rotation of the motor crankshaft 149 through the medium of chain belt 150 rotates the cam shaft 151 and accessory shaft gear wheel 152 which is rigidly secured to the accessory shaft 22. Rotation of the shaft 22 causes the drive gear 48 to rotate the worm 64, thus rotating the impeller 118.

Rotation of the impeller draws fuel downwardly through the carburetor 125, and supercharges it outwardly through the collecting duct 127 into the cross-over duct 133, thence to the intake manifold 134 of the internal combustion motor.

Water from the cooling system of the motor passes through the pipe 124 into the water jacket 123 formed in the impeller cover plate 28 and thence through the hose connection 131 into the water jacket 132 of the cross-over duct 133 from which it discharges into the water jacket 146 of the cylinder head.

The arrangement of the supercharger and cross-over duct 133 is such that the floor of the fuel conducting passageway from the supercharger to the intake manifold is on a continual decline so that liquid fuel which may condense on the walls of the cross-over duct can not form in puddles, but drains at all times and at all places from the floor of the supercharger to the intake manifold 134.

Formal changes may be made in the specific embodiment of the invention described without departing from the spirit and substance of the broad invention, the scope of which is commensurate with the appended claims.

I claim:

1. The combination of an internal combustion motor, having an intake manifold along one side thereof, a supercharger mounted at the opposite side thereof, a duct connecting and providing communication between said supercharger and intake manifold, a detachable cylinder head on said internal combustion motor, said duct being detachable, and said supercharger and intake manifold being located and arranged so that said cylinder head may be removed from said engine without removing said supercharger or intake manifold.

2. The combination of an internal combustion motor having an intake manifold along one side thereof, a supercharger mounted at the opposite side of said motor, the mounting of said supercharger being adjustable, a cross over duct providing communication between said supercharger and intake manifold, one of the connections of said cross over duct with said supercharger and intake manifold being flexible whereby to permit minor adjustments of said supercharger mounting.

FLOYD F. KISHLINE.